United States Patent [19]
Viola et al.

[11] Patent Number: 5,651,441
[45] Date of Patent: Jul. 29, 1997

[54] CLUTCH MODULE HAVING A COVER PLATE SNAP-FITTED TO THE FLYWHEEL

[75] Inventors: Paolo Viola, Paris; Michelle Sevennec, Sainte Gemme, both of France

[73] Assignee: Valeo, Paris, France

[21] Appl. No.: 454,245

[22] PCT Filed: Oct. 19, 1994

[86] PCT No.: PCT/FR94/01214
§ 371 Date: Jun. 5, 1995
§ 102(e) Date: Jun. 5, 1995

[87] PCT Pub. No.: WO95/11391
PCT Pub. Date: Apr. 27, 1995

[30] Foreign Application Priority Data

Oct. 20, 1993 [FR] France .................. 93 12504

[51] Int. Cl.$^6$ .............. F16D 13/70; F16D 13/50
[52] U.S. Cl. .................. 192/70.11; 192/70.16; 403/315; 403/335
[58] Field of Search .............. 192/70.11, 70.13, 192/70.16, 70.27, 112, DIG. 1; 403/315, 335

[56] References Cited

U.S. PATENT DOCUMENTS 2,201,340  5/1940  Hunt .
3,499,512  3/1970  Maurice .
5,143,190  9/1992  Westendorf et al. ............ 192/70.27
5,392,888  2/1995  Kajitani et al. .................. 192/70.16

FOREIGN PATENT DOCUMENTS 2526105  11/1983  France .
2661722  11/1991  France .
3802955   9/1988  Germany .
2248476   4/1992  United Kingdom .

*Primary Examiner*—Richard M. Lorence
*Attorney, Agent, or Firm*—Longacre & White

[57] ABSTRACT

A clutch module (10) is of the kind comprising a mechanism (11), a clutch friction wheel (12) and a flywheel (13), the mechanism (11) itself comprising a cover plate (14), which, for its attachment to the flywheel (13), comprises, at least locally, engagement member(s) (39) through which it is in engagement with a groove (40) provided for this purpose on the outer peripheral edge (42) of the flywheel (13).

The engagement member(s) (39) are snap-fitting member(s), and a crown (50), for example the starter crown, prevents it from moving.

Application in particular to clutch modules for motor vehicles.

9 Claims, 1 Drawing Sheet

CLUTCH MODULE HAVING A COVER PLATE SNAP-FITTED TO THE FLYWHEEL

This invention relates to clutch modules, especially for motor vehicles.

As is known, a clutch module is a unit which comprises, considered in axial succession, a mechanism, a clutch friction wheel and a flywheel, the mechanism itself comprising a cover plate which is attached to the flywheel, a diaphragm which engages on the cover plate, and a pressure plate on which the diaphragm bears so as to clamp the friction liners of the friction disc between the pressure plate and the flywheel.

For the attachment of the cover plate to the flywheel, it is known to provide, at least locally on the cover plate, engagement means through which the said cover plate is in engagement with a groove which is provided accordingly, for that purpose, on the outer peripheral edge of the flywheel.

This is the case for example in at least some of the embodiments described in the documents FR-A-2 526 105 and FR-A-2 661 722.

In those documents, the engagement means of the cover plate are seaming means, with the cover plate having an extension through which it is engaged axially on the outer peripheral edge of the flywheel, and of which some portions at least are then upset radially into the groove of the latter.

Since it involves working in the radial direction, the necessary seaming operation inevitably complicates assembly, and in addition it calls for complex tooling.

In the document GB-A-2 248 476, these engagement means comprise at least one snap lug which extends generally axially and is elastically deformable in the radial direction, and which has a local deformation extending radially towards the axis of the assembly, through which it is in engagement with the groove of the flywheel.

This deformation comprises, integrally and considered in axial succession, a first portion which constitutes an inwardly extending portion, being directed generally towards the axis of the assembly, and a second portion which constitutes an engagement portion.

For the purpose of attaching the cover plate to the flywheel, it is then sufficient to engage the cover plate axially on the flywheel until the deformation of its snap lug or lugs comes into engagement with the groove of the latter.

In use, the said snap lug is subjected to centrifugal forces. This can result in the risk of the said snap lug escaping accidentally from the flywheel, with the mechanism becoming separated with respect to the flywheel.

An object of the present invention is to overcome this drawback. According to the invention, a crown being engaged on the outer peripheral edge of the flywheel, the said crown at least partially covers the groove of the flywheel, thus confining therein, at least partly, the free end of the snap lug.

The crown is thus engaged on the outer peripheral edge of the flywheel in order to retain the said snap lug or lugs. In addition, it is possible to reduce the snap fitting force by providing a radial clearance between the flywheel and the principal or main portion of the snap lug, since the crown then prevents movement of the said lug.

All centrifugation of the said snap lug or lugs is thus avoided, being prevented with the aid of the said crown.

Thus a module is obtained which runs no risk of coming apart in service.

Preferably, the first portion of the deformation extends obliquely with respect to the axis of the assembly, being convergent on the said axis as it extends away from the clutch friction wheel, and the same is true for the corresponding flank of the groove against which the said first portion bears.

Thanks to this arrangement, the clearances between the cover plate and the flywheel can be taken up, and the cover plate can be clamped.

To this end, a radial clearance preferably exists between the base of the groove and the second portion of the deformation of the snap lug or lugs received in the groove.

The features and advantages of the invention will appear more clearly from the description which follows, by way of example only and with reference to the attached diagrammatic drawings, in which.

Figure 1:
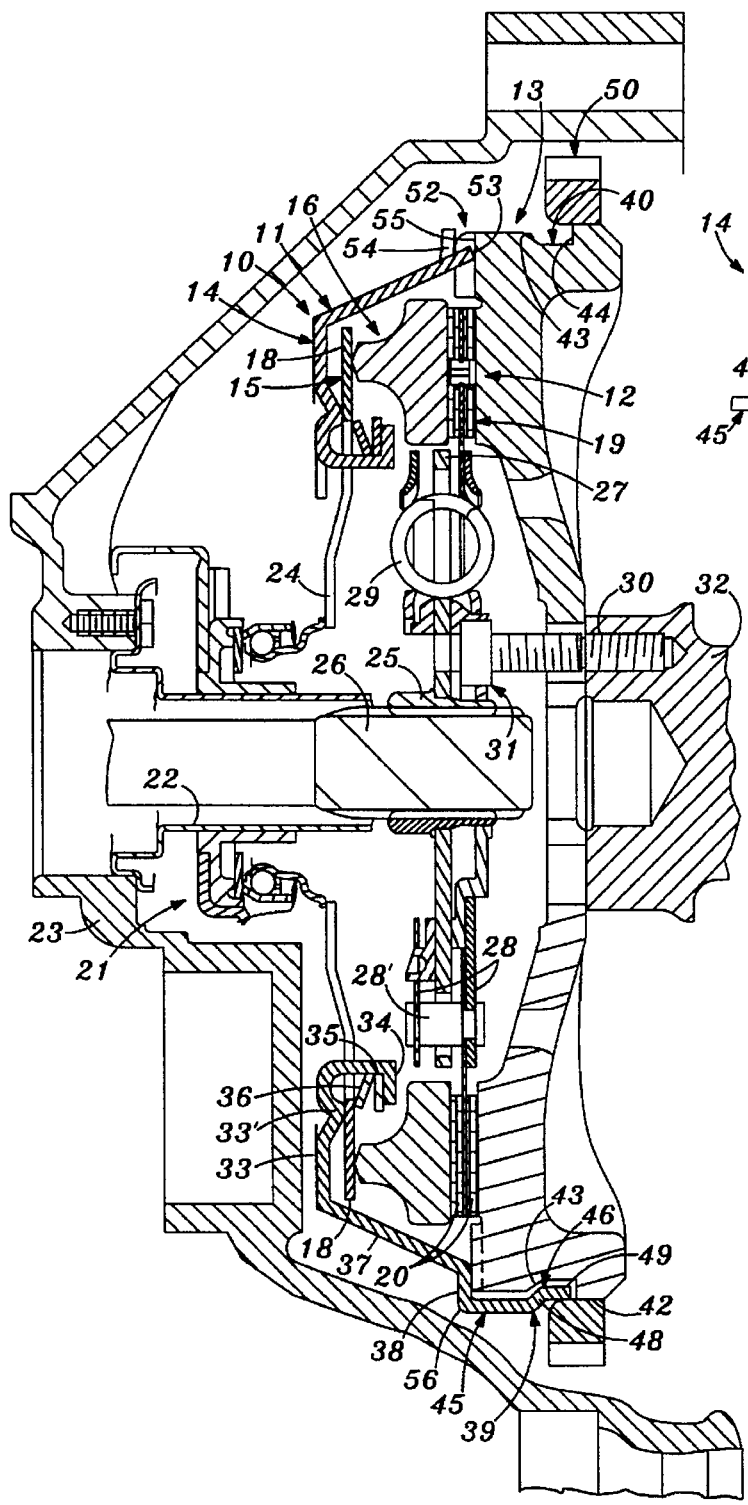
FIG. 1 is a view in axial cross section of a clutch module in accordance with the invention.

As is shown in the drawings, the clutch module 10 in accordance with the invention, which constitutes a unitary assembly, comprises in axial succession and in a known manner a mechanism 11, a clutch friction wheel 12, and a flywheel 13.

The mechanism 11 itself comprises, in axial succession, a cover plate 14 which, as will be described below, is applied to the flywheel 13, a diaphragm 15 which engages on the cover plate 14, and a pressure plate 16 on which the diaphragm 15 bears.

In this example the mechanism 11 is of the "push to release" type. The diaphragm 15 accordingly engages on the cover plate 14 on that side of its peripheral portion 18, defining a Belleville ring, that has the smaller diameter, while it bears on the pressure plate 16 on that side of the latter which has the periphery with the larger diameter.

Under the biassing action of the diaphragm 15, the pressure plate 16 is arranged to clamp against the flywheel 13 the friction liners 20 of the friction disc 19, which is part of the clutch friction wheel 12. In order to release these friction liners, and as shown in thin lines in FIG. 2, a clutch release bearing 21 is provided which, being mounted for axial sliding movement on a sleeve 22 which is fixed to the casing 23 of the assembly, is arranged to work in a thrust mode on the fingers 24 that constitute the central portion of the diaphragm 15. In this example the clutch friction wheel 12 is of the damping hub type.

Besides a hub 25 by which it is adapted to be carried in rotation on a driven shaft 26 which, in this example, is the output shaft of a gearbox, and a damper plate 27 which is secured, in this example by seaming, to the hub 25, it includes two guide rings 28, each of which extends respectively on either side of the damper plate 27 with the friction disc 19 fixed to it, with, interposed circumferentially between the damper plate 27 and the said guide rings 28, circumferentially acting resilient means, which in this example are springs 29 of the coil spring type, each of which is individually fitted partly in a window of the damper plate 27 and partly in windows of the guide rings 28.

In this example, the friction disc 19 is backed on to one of the guide rings 28, and it is secured to the latter by means of spacer bars 28' which secure the said guide rings together.

In this example the flywheel 13 is a single component made of mouldable material, such as casting metal.

In its central part, it has a plurality of holes 30 which are spaced apart on a pitch circle for accommodating fastening screws 31 for fitting the assembly on to a driving shaft 32, which in this example is the crankshaft of an internal combustion engine.

In this example, the cover plate 14 of the mechanism 11 is a sheet metal pressing, and it comprises, considered in the transverse direction, an annular base portion 33 which provides, in this example by means of a bead 33' formed by pressing, a primary abutment for the peripheral portion 18 that defines the Belleville ring of the diaphragm 15, on a first side of the latter, with lugs 34 projecting from the base portion 33 so as to provide a secondary abutment for the said peripheral portion 18 on the other side of the latter, through a spacing ring 35 and a resilient ring 36.

In this way the diaphragm 15 is mounted pivotally on the cover plate 14. The cover plate 14 also includes a lateral peripheral wall 37, by virtue of which it extends around the diaphragm 15 and pressure plate 16 in succession, this wall being in this example of generally frusto-conical form and having a circular contour in transverse cross section.

In this example the cover plate also includes a transverse flange 38 which extends radially away from the base portion 33 and the axis of the assembly, and by means of which it bears axially on the flywheel 13. Finally, the cover plate includes, at least locally and for its application to the flywheel 13, engagement means 39 through which it is in engagement with a groove 40 provided for that purpose on the outer peripheral edge 42 of the flywheel 13.

In this example the groove 40 extends on a circle, continuously around the axis of the assembly.

It has a flank 43 on the same side as the mechanism 11, and a flank 44 on the opposite side to the latter.

The engagement means 39 of the cover plate 14 consist of snap-fitting means. They comprise at least one snap lug 45 which, in this example, projects at least locally from the flange 38, being integral with the latter, and which extends in a generally axial direction, being radially deformable elastically and having a local deformation 46 which extends radially towards the axis of the assembly and through which it is in engagement with the groove 40 of the flywheel 13.

In this example the engagement means 39 of the cover plate 14 comprise a plurality of distinct snap lugs 45 spaced apart on a circle.

However, in a modification, a single snap lug 45 continuous over 360° could be provided, provided that it has sufficiently high radial flexibility.

In this example, the deformation 46 comprised in a snap lug 45 for cooperation with the groove 40 of the flywheel 13 is formed in the free end of the said snap lug 45.

It includes, integrally and in axial succession, a first portion 48, which constitutes an inwardly directed portion because it is directed generally towards the axis of the assembly, and a second portion 49 which constitutes an engagement portion.

The first portion 48 is adapted to make engagement on the flank 43 of the groove 40 on the same side as the mechanism 11, while the second portion 49 is closer radially to the axis of the module than is the first portion 48.

In accordance with one feature, the first portion 48 is oblique with respect to the axis of the assembly, being convergent on that axis as it extends away from the clutch friction wheel 12.

The corresponding flank 43 of the groove 40 of the flywheel 13 itself extends obliquely in a substantially complementary way.

By contrast, the other flank 44 of the said groove 40 is radial in this example. The second portion 49 is arranged to penetrate into the groove 40.

Figure 2:
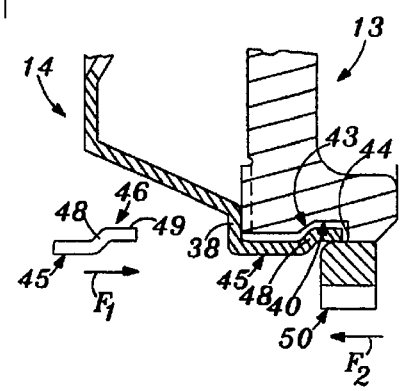
FIG. 2 is a partial view in axial cross section which partly repeats that of FIG. 1 and which illustrates the assembly of the said clutch module.

When at rest, and as is indicated in phantom lines in FIG. 2, the second portion 49 of the deformation 46 of a snap lug 45 also extends in this example obliquely with respect to the axis of the assembly.

However, it is divergent from the said axis as it extends away from the clutch friction wheel 12.

In accordance with the invention, a crown 50, which in this example is a starter crown, is engaged on the outer periheral edge 42 of the flywheel 13, and use is made of it in order to ensure the radial retention of the snap lugs 45, so as to hold the latter against any movement.

In this connection, the said crown 50 at least partly covers the groove 40 of the flywheel 13, thus at least partly confining within it the free ends of the snap lugs 45.

In this example, circumferential abutment means 52 are also interposed between the cover plate 14 of the mechanism 11 and the flywheel 13, for preventing the said cover plate from rotating on the flywheel 13.

In this example, in order to reduce the number of components, these circumferential abutment means 52 comprise lugs 53 located from place to place and extending the side wall 37 of the cover plate 14 locally in notches 54 of its flange 38, and each lug 53 engages individually with radial grooves 55 formed locally in the flywheel 13 beyond the friction disc 19 of the clutch friction wheel 12.

In this example, these grooves 55 are formed in an annular rib 56 of the flywheel 13, from which it projects at the outer periphery of the latter, and on which the flange 38 of the cover plate 14 bears.

The ribs 56 and the grooves 55 are preferably formed by moulding.

In a known manner, and not shown in the drawings, the pressure plate 16 is secured to the cover plate 14 for rotation with the cover plate, while being movable axially with respect to the latter, for example with the aid of tongues that extend transversely between the cover plate 14 and the pressure plate.

During fitting, that is to say when the mechanism 11 is being fitted in place, the cover plate 14 is engaged axially on the flywheel 13 in the direction of the arrow F1 in FIG. 2, until the deformation 46 of its snap lugs 45 comes into engagement, through its first portion 48, with the flank 43 of the groove 40 in the latter As can readily be understood, the oblique form of the second portion 49 of the said deformation 46 facilitates this engagement.

In a modification or in addition, it is possible, with the same end in view, to reduce the corresponding edge of the flywheel 13 by means of a chamfer.

In every case, axial engagement of the cover plate 14 on the flywheel 13 involves a simple temporary elastic deformation of its snap lugs 45.

In this example, there is a slight radial clearance between the outer peripheral edge 42 of the flywheel 13 and the axial portion of the snap lugs 45 lying between the flange 38 and the first portion 48, which enables the length of the said portion 48 to be increased while facilitating the fitting of the cover plate 14.

In this connection, because of this clearance, it is possible to reduce the force needed for the fitting operation, while subsequently providing retention due to the crown 50 being engaged on the second portion 49 (FIG. 1), which is thus urged inwardly, with the first portion 48 being firmly applied against the flank 43.

In FIGS. 1 and 2, the flange 38 of the cover plate 14 bears on the flywheel 13, thus providing a reference base for the fitting location of the diaphragm 15.

The engagement of the flange 38 on the flywheel 13, and the associated engagement on the flywheel, though in the opposite axial direction, of the first portion 48 of the deformation 46 of the snap lugs 45, are sufficient to prevent there being any axial clearance of the cover plate 14 with respect to the flywheel 13, the oblique configuration of the first portion 48 of the deformation 46 of the snap lugs 45 enabling clearances between those components to be taken up, and enabling manufacturing tolerances between these latter to be satisfied.

The flange 38 of the cover plate 14 is thus clamped in engagement against the flywheel 13. In addition, the snap lugs are robust.

The crown 50, which has if desired been previously positioned on the outer peripheral edge 42 of the flywheel 13 after having been heated to enable it to be shrunk on to the latter, is then displaced axially on the said outer peripheral edge 42 in the direction of the arrow F2 in FIG. 2, until it covers, at least partially, the groove 40 in the flywheel 13 and therefore the free ends of the snap lugs 45 of the cover plate 14, this being shown in FIG. 1. The crown 50 is preferably chamfered (FIGS. 1 to 3) so as to make contact with the end of the second portion 49.

All centrifugal movement of the snap lugs 45 is thus prevented.

Figure 3:
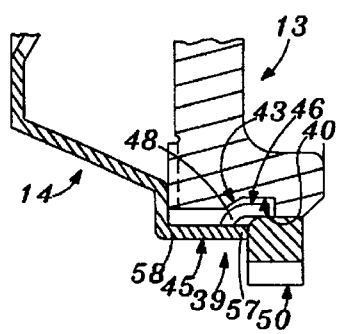
FIG. 3 is again a partial view in axial cross section partly repeating that of FIG. 1, but relating to a modified embodiment.

In a modification, the crown 50 is fixed to the flywheel 13, for example by welding. In FIG. 3, each of the snap lugs 45 has, at least locally, a lug 57 on which the crown 50 is in axial engagement, and the axial interface of the said crown 50 on the flywheel 13 is made large enough so that, on the opposite side from this axial interface, the snap lugs 45 are at the same time in axial engagement on the corresponding flank 43 of the groove 40 of the flywheel 13 through their deformations 46, and more precisely through the first portions 48 of the latter. In this way, the cover plate 14 is axially gripped somewhat between, firstly, the flank 43 of the groove 40 of the flywheel 13, and secondly the crown 50.

It will be noted that there is a radial clearance between the outer peripheral edge 42 of the flywheel 13 and the lugs 57.

In such a case, the flange 38 of the cover plate 14 is no longer necessarily in contact with the flywheel 13, the reference base necessary for fitting of the diaphragm 15 being provided for example by the crown 50. In this way the cover plate is simplified.

This being so, at least the flange 38 of the cover plate 14 can even be omitted.

In this example, the lug 57 is a direct extension of the main (or principal) portion 58 of the snap lugs 45, with the deformation 46 of the latter being formed by simple local slitting of the main portion 58. The crown 50 then bears axially on the edge of the main portion 58 of the snap lugs 45. Apart from this, the arrangements are of the same type as previously described. It will be appreciated that the slitting of the deformation 46 makes the latter more robust than that in the document GB-A-2 248 476, because there is more material in the region of the root zone of the deformations 46.

In all cases, there is a radial clearance between the main or principal lug portions and the edge 42 of the flywheel 13, in order to reduce the fitting force.

The present invention is, in addition, not limited to the embodiments described and shown, but embraces all modifications.

In particular, instead of making use of lugs 34 integral with the cover plate 14, the assembly means by which the diaphragm 15 is pivotally attached to the said cover plate 14 may make use of spacer bars, in the manner described for example in the document FR-A-1 524 350 and its corresponding U.S. Pat. No. 3,499,512.

The flywheel 13 may be in two parts, and may be part of a damped flywheel comprising two masses mounted for rotation with respect to each other against resilient means. In that case, it is necessary to provide aligned holes in the diaphragm, the clutch friction wheel and the two masses, so as to enable a fastening and screwdriving tool, for the screws that fasten the module on to the crankshaft of the engine of the vehicle, to be passed through them.

The flywheel can of course include a radial support plate which is arranged to be fixed on the crankshaft, and a crown which is fixed on the said support plate. The said crown then has the groove, and offers a friction face to the appropriate friction liners 20 of the clutch friction disc.

In place of a diaphragm, the mechanism may have a plurality of helical springs which are associated, in a known manner, with declutching levers.

The clutch may be of the pull to release type, with the outer periphery of the Belleville ring of the diaphragm 15 then engaging on the base portion of the cover plate, while the inner periphery of the said Belleville ring then bears on the pressure plate 16.

Finally, the crown 50 may be a separate component from the starter crown.

In all cases, the crown 50 is preferably chamfered at the end of its internal bore, so as to make contact with the free end of the snap lug or lugs 45, and so that the second portion 49 can be bent back towards the interior of the groove 40, with a radial clearance then existing between the base of the groove 40 and the second portion 49, the first portion 48 being clamped in contact with the flank 43.

We claim:

1. A clutch module comprising, in axial succession, a mechanism (11), a clutch friction wheel (12) and a flywheel (13), said mechanism (11) comprising a cover plate (14) which comprises, at least locally, engagement means (39) for attachment to the flywheel (13) which engages a groove (40) provided for that purpose on an outer peripheral edge (42) of the flywheel (13), wherein the engagement means (39) of the cover plate (14) comprise at least one snap lug (45) which extends axially and which is elastically deformably radially, having a local deformation (46) which projects radially towards an axis of a assembly, and wherein the deformation (46) of the snap lug (45) is formed in a free end of the snap lug (45) and comprises, in axial succession, an integral first portion (48) which is an inwardly extending portion directed generally towards the axis of the assembly, and an integral second portion (49) which is an engagement portion, wherein a crown (50) is engaged on the outer peripheral edge (42) of the flywheel (13), said crown (50) at least partially covers the groove (40) of the flywheel (30), thus confining therein, at least partly, the free end of the snap lug (45).

2. A module according to claim 1, wherein prior to attachment to the flywheel the second portion (49) of the deformation (46) of the snap lug (45) extends obliquely with respect to the axis of the assembly, being divergent from said axis in a direction away from the clutch friction wheel (12).

3. A module according to claim 1, wherein the first portion (48) of the deformation (46) of the snap lug (45) extends obliquely with respect to the axis of the assembly, being convergent with said axis in a direction away from the clutch friction wheel (12).

4. A module according to claim 3, wherein the snap lug (45) has, at least locally, a lug (57) on which the crown (50)

bears axially, and, on the side opposite to the crown (50), the snap lug (45) is in axial engagement through its deformation (46) with the corresponding flank (43) of the groove (40) of the flywheel (13).

5. A module according to claim 4, wherein the lug (57) is an extension of the main portion (58) of the snap lug (45), the deformation (46) of the snap lugs (45) being formed by simple slitting of the said main portion (58).

6. A module according to claim 3, wherein the snap lug (45) extends at least locally from a flange (38) of the cover plate (14), which extends radially and through which the cover plate (14) bears axially on the flywheel (13), and wherein the flange (38) of the cover plate (14) is clamped in engagement against the flywheel (13) through the first portion (48) of the snap lug (45).

7. A clutch module according to claim 1, wherein the engagement means (39) of the cover plate (14) comprise a plurality of distinct snap lugs (45) spaced apart on a circle.

8. A clutch module according to claim 1, wherein the cover plate (14) has a side wall (37) and a radial flange (38) through which the cover plate (14) bears axially against the flywheel (13), and in which circumferential abutment means (52) are interposed between the cover plate (14) and the flywheel (13) so as to prevent rotation of the cover plate (14) on the flywheel (13), and wherein the circumferential abutment means (52) comprise, from place to place, extension lugs (57) each of which, being a local extension of the side wall (37) of the cover plate (14) in notches (54) of radial flange (38), is individually in engagement with radial grooves (55) formed in the flywheel (13) beyond a friction disc (19) which is part of the clutch friction wheel (12).

9. A module according to claim 1, further comprising a radial clearance between the main portion (58) of the snap lug (45) and the outer peripheral edge (42) of the flywheel (13).

* * * * *